Patented Apr. 24, 1934

1,956,138

UNITED STATES PATENT OFFICE 1,956,138

PROCESS FOR THE PRODUCTION OF ANHYDROUS FUSED CAUSTIC SODA

Karl Staib, Rheinfelden, Baden, Germany, assignor to I. G. Farbenindustrie Aktiengesellschaft, Frankfort-on-the-Main, Germany No Drawing. Application October 27, 1931, Serial No. 571,463. In Germany November 4, 1930

2 Claims. (Cl. 23—184)

The present invention relates to the production of caustic alkali and is more especially concerned with an improved process for the production of anhydrous fused caustic soda.

It is difficult to produce anhydrous fused caustic soda from lyes of commercial concentration by evaporation under reduced pressure, owing to the fact that when maintaining the usual high vacuum throughout the evaporation process, crystallization occurs sooner or later. This crystallization constitutes a disadvantage since heat can only be transmitted to solid substances slowly and irregularly. Moreover, it is a much more difficult matter to withdraw a solid substance from a vessel in which a vacuum has been maintained during the process than to run off the product in a liquid form.

In order therefore to obviate these drawbacks, it has already been proposed to be contented with a product containing about 85 percent of caustic soda, since in the dehydration to that degree in vacuo the aforesaid difficulties do not as yet assume a serious character. On the other hand, it has hitherto been considered to be impossible continually to obtain the substance to be dehydrated in the fused condition when evaporating above these concentrations, and also to recover it in an anhydrous fused state.

This drawback of the known process is all the more palpable as it is just the last portion of water which evaporates with extreme slowness under atmospheric pressure and can only be removed by employing comparatively high temperatures.

It has now been ascertained in accordance with the present invention that melts containing more than 85 percent of caustic soda can also be dehydrated in vacuo whilst being simultaneously maintained permanently in a molten condition, by observing definite conditions as regards the vacuum under which the dehydration, especially in the last stages, is carried out.

It has in fact transpired that when the melt contains between 80 and 93 percent of caustic soda, the employment of even a moderate vacuum lowers the boiling point of the melt to such an extent that deposition of crystals of caustic soda already takes place at boiling temperature. On the other hand, when the melt contains more than about 93 percent of caustic soda, the boiling point curve surprisingly rises much more steeply than the curve of incipient solidification of the system NaOH—H₂O, so that in that range, it is possible again to employ a higher vacuum without running the risk of the deposition of solid crystals.

The fundamental idea of the present invention is therefore based on the fact that during the evaporation of the melt the vacuum is varied continuously or intermittently in such a manner that the boiling point of the melt which is of course determined thereby from case to case, approaches the temperature of incipient crystallization for the caustic soda concentration obtaining at the time, but does not, however, fall below said latter temperature.

*Example*

In an iron vacuum evaporator of usual design, caustic soda lye of 50° Bé. gravity is continuously caused to boil, a pressure of about 70 mms. of mercury absolute being maintained until the concentration of the caustic soda in the melt reaches about 81 percent. The boiling point of the melt at this concentration and under the said pressure amounts to about 148° C. and the melt contains no crystallized matter since the deposition of solid caustic soda from a melt of this concentration commences at a—though but slightly—lower temperature, namely at about 140° C. Since a further maintenance of the said low pressure would, however, result in a solidification of part of the boiling melt owing to the increasing concentration, the pressure is then raised substantially, namely to about 520 to 600 mms. of mercury absolute, and the temperature to about 195° to 200° C., this corresponding to the raise in the boiling point of the melt caused by the increase in pressure. Under these conditions also the further concentration of the melt up to about 91 to 92 percent of NaOH does not result in a deposition of crystals. When a concentration of about 91 to 92 percent of NaOH has been reached, the boiling point of the melt, even under a very reduced pressure, has increased to such an extent (to about 260° C.) that it is raised above the temperature of incipient solidification of the melt even when the latter is maintained under a substantially lower pressure. The pressure is therefore again abruptly and strongly reduced to about 70 mms. of mercury absolute, while maintaining the melt in a boiling condition. Thus a further vigorous evaporation of water takes place which results in that the last portions of water are already completely removed from the melt at a temperature of about 330° C.

I claim:

1. A process for the production of anhydrous fused caustic soda from lyes of technical concentration by evaporation under reduced pressure which comprises heating the lye so as to continuously maintain it in a boiling condition while first maintaining a pressure of about 70 mms. of mercury absolute until a concentration of about 80 percent is reached, then raising the pressure to between about 520 and about 600 mms. of mercury absolute until a concentration of about 91 perecent NaOH is reached and finally again reducing the pressure to about 70 mms. of mercury absolute until all the water contained in the melt is removed.

2. A process for the production of anhydrous fused caustic soda from lyes of technical concentration by evaporation under reduced pressure which comprises maintaining a vacuum of between about 520 mms. and about 600 mms. of mercury absolute within the concentration range between about 80 and about 93 percent of NaOH while maintaining the melt in the boiling condition.

KARL STAIB.